US008850901B2

(12) United States Patent
Mankame et al.

(10) Patent No.: US 8,850,901 B2

(45) Date of Patent: Oct. 7, 2014

(54) ACTIVE MATERIAL ACTUATION UTILIZING BI-STABLE MECHANICAL OVERLOAD PROTECTION

(71) Applicant: GM Global Technology Operations LLC, Detroit, MI (US)

(72) Inventors: Nilesh D. Mankame, Ann Arbor, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 13/770,340

(22) Filed: Feb. 19, 2013

(65) Prior Publication Data

US 2014/0230572 A1 Aug. 21, 2014

(51) Int. Cl.
*G01L 1/04* (2006.01)
*G01L 1/00* (2006.01)

(52) U.S. Cl.
CPC .................................... *G01L 1/04* (2013.01)
USPC ................................ 73/862.621; 73/862.381

(58) Field of Classification Search
USPC ..................................... 73/862.621, 862.381
See application file for complete search history.

(56) References Cited

U.S. PATENT DOCUMENTS

| | | | | |
|---|---|---|---|---|
| 6,598,482 | B2 * | 7/2003 | Scholz et al. | 73/716 |
| 8,179,018 | B2 * | 5/2012 | Gao et al. | 310/314 |
| 8,402,836 | B2 * | 3/2013 | Dannhauer et al. | 73/716 |
| 2002/0014122 | A1 * | 2/2002 | Bohler et al. | 73/715 |
| 2002/0100330 | A1 * | 8/2002 | Eickhoff et al. | 73/715 |
| 2002/0194920 | A1 * | 12/2002 | Scholz et al. | 73/718 |
| 2012/0180574 | A1 * | 7/2012 | Clegg et al. | 73/862.621 |

* cited by examiner

*Primary Examiner* — Lisa Caputo
*Assistant Examiner* — Jamel Williams
(74) *Attorney, Agent, or Firm* — Dierker & Associates, P.C.

(57) ABSTRACT

An actuation assembly adapted for driving a load, and protecting against overload conditions, includes an actuator defining a stroke, and an overload protection device including at least one elastic member having a nonlinear force-deflection characteristic defining a limit point and negative stiffness region, drivenly coupled to the actuator opposite the load, and operable to provide a secondary work output path when an overload condition exists.

15 Claims, 4 Drawing Sheets

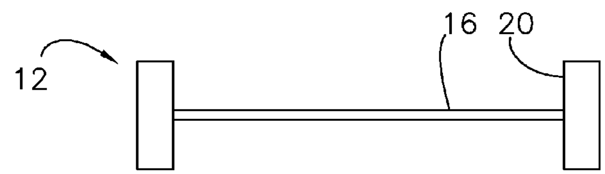
FIG. 1a
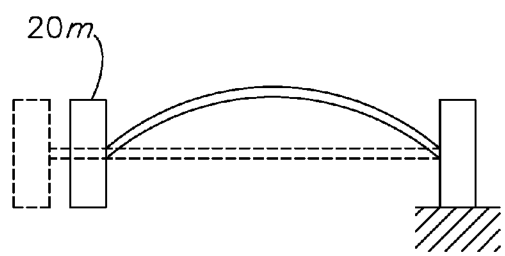
FIG. 1b
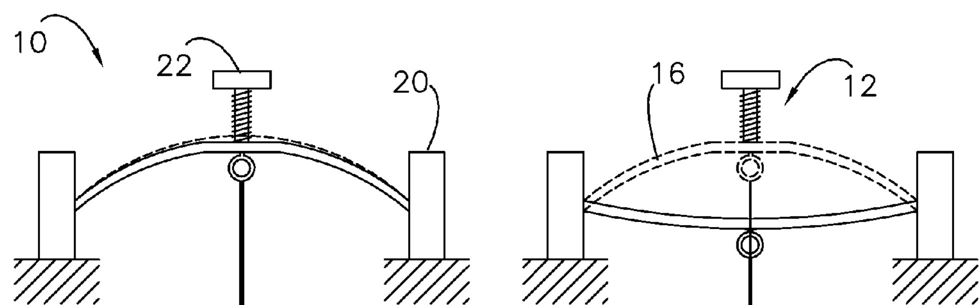
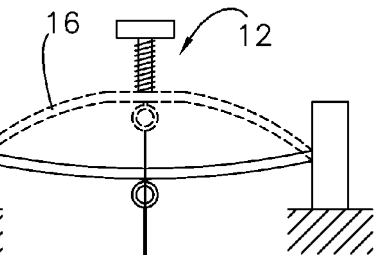
14
FIG. 1c
100
FIG. 1d
100

ACTIVE MATERIAL ACTUATION UTILIZING BI-STABLE MECHANICAL OVERLOAD PROTECTION

BACKGROUND

Active material actuators, such as shape memory alloy wires, are generally protected from mechanical overload by the use of mechanical springs or electrical-control schemes to avoid damage to the actuators when the output load exceeds a recommended limit. Both of these measures, however, may present various concerns in the art. For example, linear mechanical springs needed for overload protection tend to be bulky because of the conflicting requirements of high force threshold for the overload function necessary to enable normal operation, and low stiffness to restrict the maximum stress experienced by the actuator when the overload protection system is activated. Meanwhile, more versatile electrical/control schemes that rely on timing and/or feedback have been developed; but they may in some instances present concerns of their own, such as increased system costs.

SUMMARY

An actuation assembly adapted for driving a load and preventing or mitigating an overload condition includes an actuator defining a stroke and presenting a design threshold force. The assembly further includes an overload protection device having at least one elastic member defining a force-deflection characteristic having a limit point and negative stiffness region therein. The member is drivenly coupled to the actuator opposite the load, and presents an initial deformation force not greater than the design threshold force, so as to define a non-linear force versus displacement relationship over the stroke when the actuator experiences an overload condition.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1*a* is a partial elevation of an actuation assembly including an overload protection device including a beam or planar body defining a longitudinal ends, and bowed by supports fixed at the ends, so as to exhibit snap-through behavior, in accordance with an example of the present disclosure;

FIG. 1*b* is a partial elevation of the assembly shown in FIG. 1*a*, wherein a pre-load has been added and the beam or body has been further bowed by laterally displacing at least one the supports, in accordance with an example of the present disclosure;

FIG. 1*c* is an elevation of the assembly shown in FIG. 1*b*, further illustrating a shape memory alloy wire actuator transversely coupled to the midpoint of the beam and to a load opposite the overload protection device, wherein the beam or body has been further pre-loaded by securing the ends and transversely displacing the midpoint of the beam or body with a set screw, and the actuator has been actuated to drive the load, in accordance with an example of the present disclosure;

FIG. 1*d* is an elevation of the assembly shown in FIG. 1*c*, wherein the actuator has been actuated, and an overload has been triggered, the overload device causing the member to snap through a negative stiffness region;

DETAILED DESCRIPTION

Figure 2:
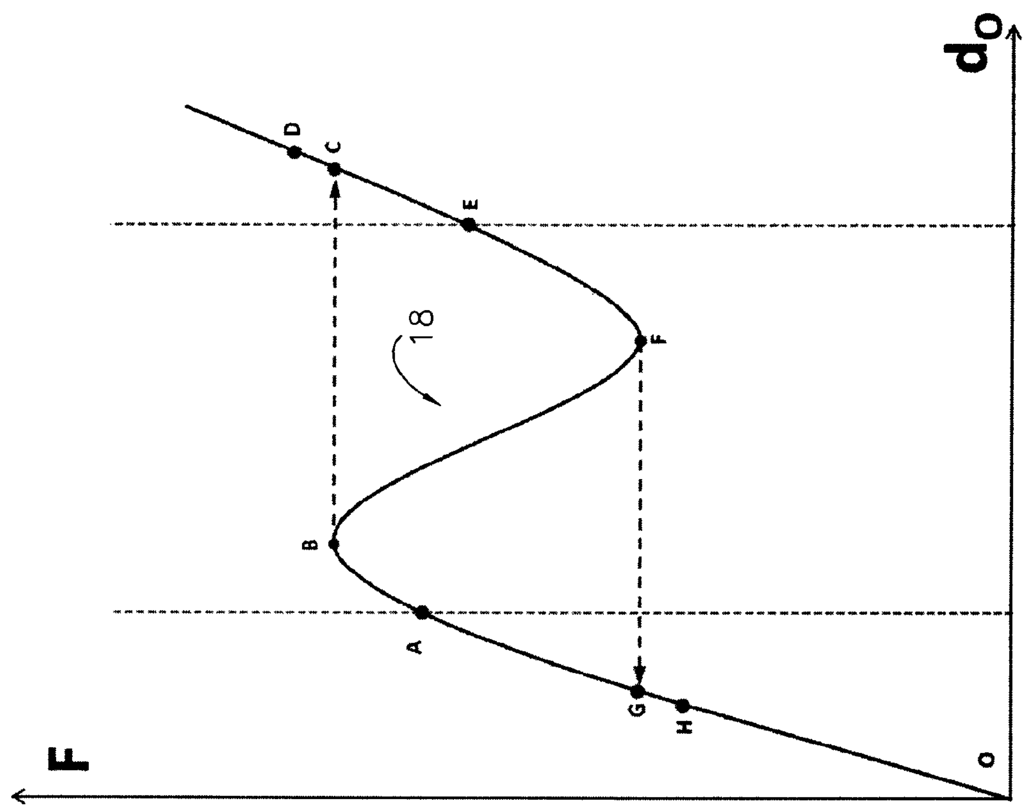
FIG. 2 is a line graph showing a force-displacement space for the non-linear overload protection device of FIG. 1*d*, in accordance with an example of the present disclosure.

The present disclosure generally relates to devices for, and methods of protecting an actuator against overload conditions; and more particularly, to a device for and method of overload protection that utilize an elastic member defining a force-deflection characteristic having a limit point and negative stiffness region therein, and more preferably, bi-stable action to accomplish the same.

As an overload protection device, the present disclosure offers a secondary path for work output when the system experiences a mechanical overload event, wherein a mechanical overload event is deemed to have occurred when the motion of the end of the actuator that is attached to the output load is restrained in a manner that requires significantly higher force for continued motion than is typical for the system or application. Mechanical jamming of the output load itself or of any component that mechanically couples the actuator to the output load is a typical example of a mechanical overload event. Under this circumstance, the force needed to break the system free of the jammed state can be significantly greater than the force required for normal operation of the system. This force may exceed the design force level for the actuator. For an actuation system where the power supplied to the actuator is turned off only when the actuator has completed its entire stroke, a mechanical overload event can cause the actuator to exceed its design force level thereby leading to permanent deterioration of the actuator performance.

By employing an elastic member defining a force-deflection characteristic having a limit point and negative stiffness region therein, and more preferably bi-stable action, the present disclosure is useful for offering a non-linear overload protection system. That is to say, once the disclosed overload protective device is triggered, the actuator does not perform work and is in fact aided during the manipulation of the member through the negative stiffness region. The present disclosure uses the sharp reduction in modulus due to the negative stiffness to provide a high overload force threshold and a low post-overload stiffness without significantly increasing the bulk/size of the actuator. Although a shape memory SMA based primary actuator provides a natural context for describing the use of the disclosed overload protection system, it should be noted that the proposed overload protection system can be used with any primary actuator that shares the high overload force threshold and low post-overload stiffness characteristics needed by SMA wire based actuators.

In general, an actuation assembly adapted for driving a load, and preventing overload conditions is recited. The assembly includes an actuator drivenly coupled to the load, defining a stroke, and presenting a design force threshold (e.g., maximum or safe actuation force/sustainable stress). The assembly further includes at least one non-linear elastic member having at least one limit point and a negative stiffness region in its force-deflection characteristic drivenly coupled to the actuator opposite the load. The member is operable to be displaced over the entire stroke of the actuator. The resistive member behaves like a rigid mechanical coupling as long as the force in the actuator is less than a design threshold force. Under these circumstances, any force developed by the actuator is effective to do work on the output load. These represent the normal operating conditions for the system, i.e., there is no mechanical overload and the overload protection system is not activated. When the force in the actuator exceeds the design threshold force, which is typically chosen to be greater than the maximum force required to drive the output load under normal operating conditions, the overload protection system is activated. The proposed overload protection system uses a resistive member with a non-linear force-deflection characteristics: the stiffness is high for forces lower than the design threshold and comparatively much lower when the force is greater than the design threshold force. A bi-stable configuration of the member presents a negative stiffness region that results in a non-linear force versus displacement relationship over the stroke in both directions.

Referring to FIGS. 1-5, examples of the present disclosure concern a novel actuation assembly or system 10 including an overload protection device 12 and actuator 14. The assembly 10 is configured to drive a load 100 and provide mechanical overload protection when the load 100 is greater than the design threshold force specified for the actuator 14 (FIG. 1*d*). Many active materials based actuators (e.g. SME-SMA wires) possess a small useful stroke. Therefore, in mechanical overload protection systems for such actuators, the overload protection system must not detract from the stroke under normal operating conditions. At the same time, the overload protection systems must be capable of allowing the actuator to complete its entire stroke while limiting the maximum force experienced by the actuator to a safe value when a mechanical overload event occurs. Conventional mechanical overload protection systems accomplish this using pre-loaded linear springs. The pre-load in the springs can be set when the springs are manufactured or it can be accomplished by imposing mechanical contact constraints e.g., a pre-load screw that keeps the spring deformed by exerting the specified pre-load force on the spring. The resulting overload protection system has high stiffness until the force in the actuator exceeds the pre-load force level; beyond this point, the overload protection system exhibits a stiffness corresponding to the native stiffness of the linear spring. This leads naturally to conflicting requirements on the design of the overload protection system. A high pre-load force requires either an overload spring with a high native stiffness or an overload stiffness spring with low native stiffness that is pre-loaded through a significant part of its useful deflection range to achieve the high preload force. The former approach leads to a compact design for the overload protection system but results in high maximum force levels in the actuator during a mechanical overload event. In contrast, the latter approach can result in much lower maximum force levels in the actuator during a mechanical overload event but it leads to an unwieldy overload protection system due to the large undeflected size of the overload protection spring.

The proposed system 10 reduces the stress within the actuator 14 after a mechanical overload event has initiated overload protection system, and offers minimal reduction in useful stroke during normal operation of the system. It overcomes the above trade-off inherent in the design of mechanical overload protection systems based on linear springs by using a non-linear elastic member having at least one limit point and a negative stiffness region in its force-deflection characteristic as the basis of the overload protection system. As in the conventional overload protection systems, a mechanical constraint can be used to adjust the pre-load in the non-linear spring based on the desired design threshold force.

Thus, in general, the present disclosure presents a device 12 for, and method of providing overload protection to an actuator 14, including but not limited to active material actuators, that employ an elastic member defining a force-deflection characteristic having a limit point and negative stiffness region therein, and more preferably, a bi-stable member 16 to effect a non-linear force versus displacement profile. As used herein, the term "bi-stable" member shall encompass any member that exhibits snap-through behavior. The present disclosure is suitable for use by any actuator 14 that defines a stroke, presents a maximum or safe actuation force/sustainable stress (either inherently or with respect to the actuated mechanism), and is susceptible to overloading. In an automotive or commercial setting, for example, the actuation assembly 10 may be used to safely drive at least one exterior vent cover (not shown) susceptible to obstruction by snow, ice, mud, or the like.

As previously mentioned, the present disclosure is particularly suited for use with active material actuators 14, wherein the term "active material" is defined as any of those materials or composites that exhibit a reversible change in fundamental (i.e., chemical or intrinsic physical) property when subjected to an activation signal. Suitable active materials for use as an actuator include but are not limited to shape memory materials that have the ability to remember their original at least one attribute such as shape, which can subsequently be recalled by applying an external stimulus. Examples of shape memory materials for use as actuators include shape memory alloys (SMA), shape memory polymer (SMP), shape memory ceramics, electroactive polymers (EAP), ferromagnetic SMA's, electrorheological (ER) compositions, dielectric elastomers, ionic polymer metal composites (IPMC), piezoelectric polymers, piezoelectric ceramics, various combinations of the foregoing materials, and the like.

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials including shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this disclosure, it is appreciated that SMA's exhibit a modulus increase of 2.5 times and a dimensional change of up to 8% (depending on the amount of pre-strain) when heated above their Martensite to Austenite phase transition temperature. Stress induced phase changes in SMA known as superelasticity (or pseudoelasticity) refers to the ability of SMA to return to its original shape upon unloading after a substantial deformation in a two-way manner. Application of sufficient stress when an SMA is in its Austenitic phase will cause it to change to its lower modulus Martensitic phase in which it can exhibit up to 8% of superelastic deformation. Removal of the applied stress will cause the SMA to switch back to its Austenitic phase in so doing recovering its starting shape and higher modulus, and dissipating energy. More particularly, the application of an externally applied stress causes martensite to form at temperatures higher than $M_s$. The macroscopic deformation is accommodated by the formation of martensite. When the stress is released, the martensite transforms back into austenite and the SMA returns back to its original shape. Superelastic SMA can be strained several times more than ordinary metal alloys without being plastically deformed, however, this is only observed over a specific temperature range, with the largest ability to recover occurring close to $A_f$.

Returning to the configuration of the present disclosure, the actuator 14 may be presented by at least one shape memory wire, wherein the term "wire" shall be construed to include other tensile structures such as cables, braids, chains, etc., that perform equivalently. The overload protection device 12 is configured to provide a secondary work output path (FIG. 1*d*) for the actuator 14 that prevents or mitigates a mechanical overload condition (e.g., wherein tensile stress within the shape memory wire exceeds its tensile strength). An example of device 12 includes an elastic member 16 offering at least one limit point and negative stiffness area in its force-deflection characteristic, and more preferably, bi-stable action, wherein a positive stiffness region, the negative stiffness region, and then another positive stiffness region serially follow, as shown in FIG. 2. That is to say, whereas the bi-stable member 16 offers a drop in force during the stroke resultant from the negative stiffness region 18 (FIG. 2), once the stroke is complete and the actuator 14 is de-actuated, an example of the preferred bi-stable member 16 is configured to autonomously return to its original condition, so as to reset the overload protection device 12. As further described below, the member 16 will be described as the "bi-stable member," without limitation.

The illustrated bi-stable member 16 is connected in series with the wire 14 at an intermediate point, and more preferably, the midpoint, and is fixed at its opposite ends, so as to be driven by the actuator 14. An example of the bi-stable member 16 presents a resistively bendable, elongated beam (or planar body) that defines an operative free length and is compressed by first and second rigid supports 20 at its distal ends. That is to say, the supports 20 are relatively positioned so as to define a spacing less than the length that cause the beam 16 to bow away from the actuator 14. This stores energy within the beam 16 that can be later harvested to effect the disclosed "snap-through" nonlinear force-displacement relationship. More preferably, the beam 16 is compressed by at least one moveable support 20*m* (FIG. 1*b*), so as to adjust the degree of initial bowing and energy storage depending upon application. Next, the bi-stable member 16 is further displaced to a point where the applied preload corresponds to the design threshold force, e.g., load level where it is appreciated that the actuator 14 would begin to experience excessive stress where the primary work output path is blocked. In the illustrated example, a set screw 22 is positioned so as to be manually caused to encroachingly engage the mid-point of the beam 16. It is appreciated that an example of the preferred set screw 22 is also adjustable depending upon certain factors, such as load characteristics, factor of safety, and timing. As a result, activation of the actuator 14 will first apply a force that attempts to manipulate the load 100, but if the force level exceeds the preload in the member 16 (e.g., the load is blocked, etc.), the actuator 14 will instead trigger the bi-stable member 16, thereby preserving the integrity of the actuator 14 and/or driven mechanism (not shown).

More particularly, the present disclosure presents a non-linear overload protection device 12 including a pre-loaded elastic member (e.g., beam) 16 that exhibits 'snap-through' behavior under load-controlled traversal of a limit point in its elastic response to effect compact mechanical overload protection for an (e.g., SMA) actuator 14. The work done in deforming the member 16 is stored as strain energy (FIGS. 1*b,c*). As illustrated, a set screw 22 or other pre-tensioner applies an orthogonal force vector at the midpoint of and against deflection (or otherwise drives) the beam 16 to apply further strain (FIG. 1*c*). The action of the supports 20 and screw 22 on the beam 16 determine the pre-load and are shown through a comparison of the unencroached beam profile superimposed in FIG. 1*c*. The beam 16 is then mechanically connected to the SMA element 14 in series (FIGS. 1*c,d*). This combination is then connected mechanically in series with the load 100, which may be modeled as bias and external load springs. A model displacement of the end of the SMA actuator 14 is plotted in FIG. 3 using the coordinate system defined by $\{F, d_S\}$.

Figure 3:
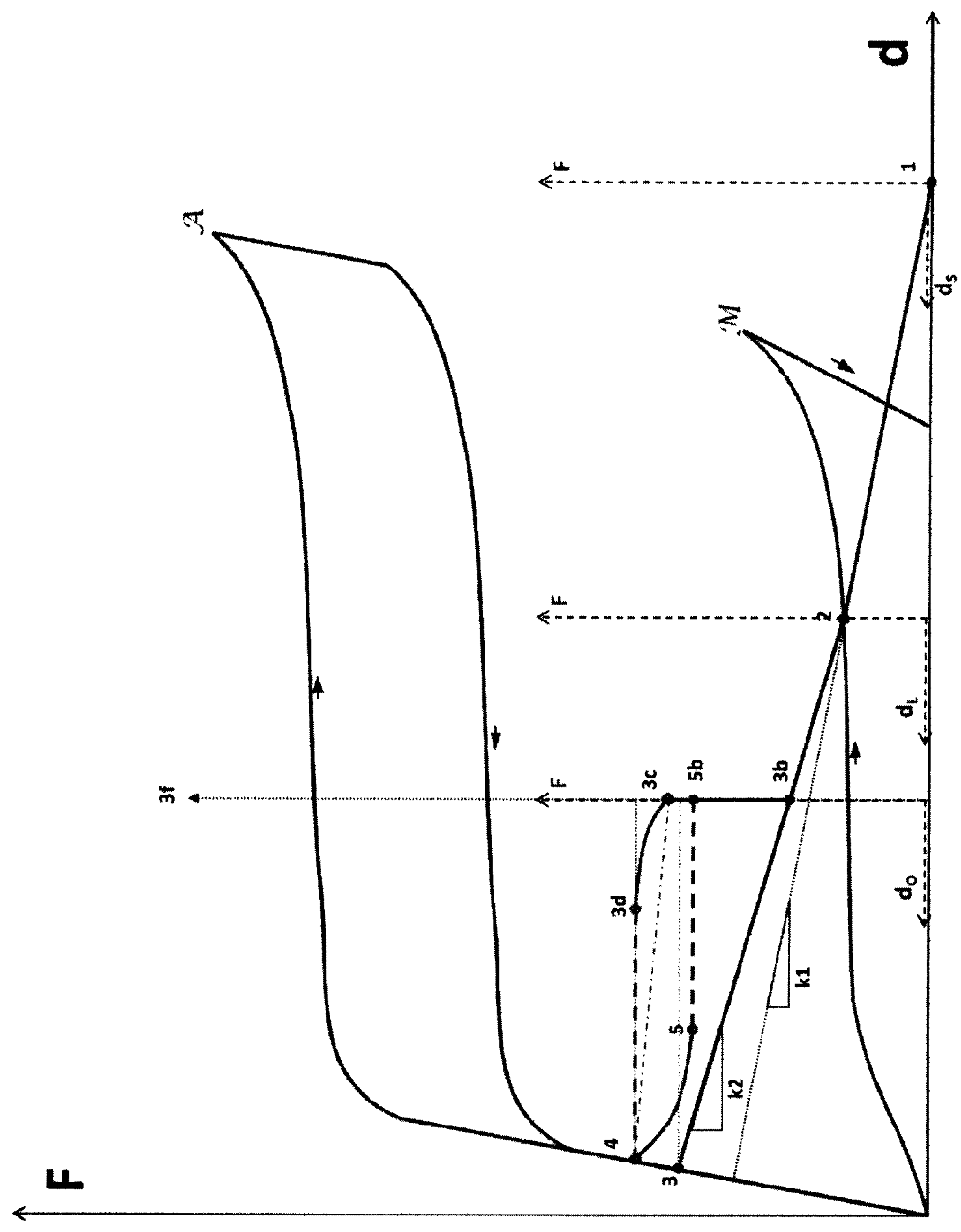
FIG. 3 is a line graph showing a typical force-displacement space for the overall system performance of FIGS. 1*c* and 1*d;*

More particularly, in FIG. 3, M is the mechanical response of SMA when in its martensitic state at a temperature $T_i<A_s$, and A is the mechanical response of SMA when in its austenitic state at a temperature $T_f>A_f$. The deflections of the various non-SMA elements (i.e. bias and load springs representative of the forces acting upon the working end of the actuator, and a linear overload protection spring acting on the opposite end in the illustrated example) are plotted on a displacement (d-)axis that is inverted with respect to the axis for the deflections of the SMA element. This is in keeping with conventional practice which facilitates overlaying the SMA and spring forces in the determination of the various system operation points. The preload in the overload protector has a magnitude F3c, which is the value read off the Y-axis corresponding to the point labeled 3c. The overload protector acts like a rigid link until the force F in the SMA, and hence in the protector, reaches F3c. When F≥F3c, the protector acts like a linear spring with a spring rate (or stiffness) of $k_o$ ($k_o=k_3$ in FIG. 3). This combination is then connected in series with a bias spring. The force in the bias spring and the displacement of its end that is connected to the SMA are plotted using the coordinate system defined by $\{F, d_S\}$ in FIG. 3. The force in the bias spring during this operation is the same as that in the SMA element. The SMA stretches and the bias spring deforms until they achieve mechanical equilibrium at point 2. This moves the system from 1 to 2 in FIG. 3. Where F2<F3c, the overload protector behaves like a rigid link during this step of the assembly process. The load spring is then added at 2. Typically, the load spring has zero preload in the as-assembled state. The subsequent displacement of the end of the SMA that is connected to the load is plotted using the coordinate system defined by $\{F, d_L\}$ in FIG. 3. When the SMA begins to actuate at a temperature $T>A_s$, the system state begins to move along the line 2-3 (FIG. 3) as the SMA contracts and moves the external load from 2. The effective stiffness of the bias and load springs acting mechanically in parallel is denoted by $k_2$. Under normal operating conditions, this process is completed when the system state has moved to 3, and corresponds to a stroke of |d2−d3|. Nominally, the actuation process is complete when the SMA temperature reaches the $A_f$ value corresponding to the force level F3. However, typically, the SMA is heated to a $T>A_f$, where, $A_f$ is the Austenite finish temperature corresponding to the stress in the SMA associated with the load F3, to ensure complete transformation and to account for errors in measurement of temperature and force. When the SMA is de-activated, the system state moves back along the line 2-3 until it reaches 2. The maximum load experienced by the actuator 14 during the assembly process is lower than the pre-load in the member 16, therefore, there is no change in the configuration of the beam 16 during the last step of the assembly process.

FIG. 2 shows the force-displacement characteristics of the overload protection device 12 described above. Specifically, it shows the variation of the transverse displacement $d_O$ at the mid-span of the beam 16 to a transverse force F applied at the same location. The initial configuration (FIG. 1*b*), prior to preloading, is chosen as the reference configuration as there is no transverse force acting on the beam in this configuration. The action of set screw 22 causes a transverse displacement that moves the system 10 to its ready state which is reflected in the F-$d_O$ space by a move from point O to point A (FIG. 2). Point A reflects the point where the set screw stops doing work. This preloads the beam 16 and the work done by the set screw 22 is stored therein as strain energy. It is appreciated that the strain energy, the initial shape (FIG. 1*a*) and the type of loading result in a negative stiffness region 18 defined by points B-F in the elastic response of the beam. It is particularly advantageous that the inflection point F in the response not correspond to a local minimum in the potential energy versus displacement space, so that the device 12 is biased back towards the ready set position at the end of the stroke. Hence, at the point F the beam 16 is not in a stable configuration in the same way that it is at point O (i.e., FIG. 1*a*) or A. Alternatively, where the beam 16 is caused to achieve a stable configuration, it is appreciated that an example of the preferred device 12 may further include an autonomous return mechanism (not shown), such as a superjacent layer of spring steel configured to store energy during the overload event and return the beam 16 to the ready state condition after the stroke.

FIG. 3 further summarizes the operation in the force-displacement space of the overall system 10 during an overload event. As before stated, a jam in the system 10 causes the motion of the work end of the actuator 14 (FIG. 1*d*) to be fixed when the system 10 is at the point 3b in FIG. 3, while the actuator 14 is being actuated. Following the same convention, we change from plotting the motion of the work end with reference to the coordinate system defined by $\{F, d_L\}$, to plotting the motion of the normally fixed or overload end of the actuator 14, with reference to the coordinate system defined by $\{F, d_O\}$, starting with 3b. The force in the actuator 14 rises along 3b-3c as it is actuated (e.g., heated) while both of its ends are unable to move. In the absence of a mechanical overload protection system, the force in the actuator 14 would continue to evolve along 3b-3f resulting in permanent degradation in performance (FIG. 3). In the present disclosure, the fixed end of the actuator 14 attached to the overload device 12 does not move until the force in the actuator 14 reaches the level $F_{3c}$ in FIG. 3, or A in FIG. 2, corresponding to the pre-load in the beam 16. As the force in the actuator 14 increases beyond $F_{3c}$, the beam 16 begins to deflect under the action of the actuator 14. This causes the system 10 to move from 3c to 3d in FIG. 3 corresponding to a change in configuration of the beam 16 from points A to B in FIG. 2.

In FIG. 2, point B is a limit point in the elastic response of the beam 16; that is to say, its stiffness changes signs as we traverse B. Traversal of 3d in FIG. 3, which corresponds to B in FIG. 2, under increasing force in the actuator 14 (i.e. under force control) causes the beam 16 to spontaneously transition from 3d to 4 in the overall system space (FIG. 3), and from B to C in FIG. 2. This 'snap-through' or non-equilibrium transition is shown by a dashed line in FIGS. 2 and 3 because only the end points are known accurately under static analysis. Determination of the exact path between these endpoints requires consideration of the dynamic response of the entire assembly 10. It is appreciated that the point of attachment between the actuator 14 and the beam 16 can move faster than the loaded end of the actuator 14 during this phase, which may cause an SMA wire actuator 14, for example, to go slack depending on the actuation rate. The actuator 14 actuates through its complete stroke by the time the system 10 evolves to point 4 (FIG. 3). Due to inertia, the beam 16 typically overshoots point C and moves to D before unloading along the positive stiffness branch to point E (FIG. 2). The beam 16 cannot unload any further because the fully actuated actuator 14 catches up it. Kinematic compatibility requirement coupled with the high axial stiffness of the actuated actuator 14 (e.g., Austenitic SMA) constrains the motion of the beam 16.

The dynamics of the process that leads the system 10 to attain equilibrium at point E (FIG. 2) or 4 (FIG. 3) results in a net maximum force in the actuator 14 that includes the static and dynamic forces associated with catching up to and suddenly stopping the motion of the beam 16. Proper design of the various elements of the system 10, possibly including means to dampen the motion of the beam 16 (e.g., a snubber, rubber washer, or other energy absorbing element), so as to mitigate dynamic effects, and ensure that the max force seen by the actuator 14 is less than the acceptable limiting force. Thus, the maximum force seen by the actuator 14 is significantly lower than if a mechanical overload protection system were absent.

When the actuator 14 is de-actuated, e.g., the SMA transforms from the higher modulus Austenitic-phase back to the lower modulus Martensitic-phase, the beam 16 is able to overcome the constraint imposed by the actuator 14 and it continues to unload along E-F in FIG. 2, while the system moves from 4 to 5 in FIG. 3. Point F (FIG. 2) is another limit point in the elastic response of the beam 16. As the force in the actuator 14 drops below the magnitude corresponding to the force at point 5 in FIG. 3, the beam 16 traverses the limit point F under decreasing force (i.e. under force control). This results in another 'snap-through' or non-equilibrium transition from F to G in FIG. 2 and from points 5 to 5b in FIG. 3. As with the previous snap through, the exact path taken by the system 10 cannot be determined under a purely static analysis, hence these transitions are again shown by dashed lines in the respective figures. Inertia accompanying the snap-through causes the beam 16 to overshoot the configuration ready state (FIG. 1*c*) corresponding to point A in FIG. 2 and point 3c in FIG. 3. Point G hypothetically corresponds to a transitory configuration wherein the beam 16 undergoes vibration about its ready state configuration under the displacement constraints imposed by the supports 20 and set screw 22. Eventually, the vibrations die out and the beam 16 retains the ready state configuration (FIG. 1*c*), reflected by point A in FIGS. 2 and 3*b* in FIG. 3. This corresponds to the displacement of the fixed end reverting back to point 0 in its reference frame.

Figure 4:
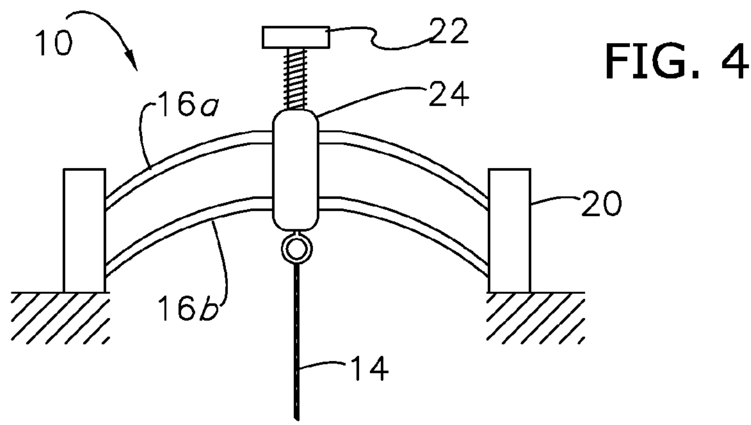
FIG. 4 is an elevation of an actuation assembly including an active material actuator having drivenly attached thereto an overload protection device including a plurality members exhibiting snap-through behavior and coupled by a rigid coupler, in accordance with an example of the present disclosure.

The force threshold at which the 'snap-through' occurs depends on the geometry, material properties, nature of boundary conditions, etc for the overload member 16. As previously mentioned, the marginal force needed to take the actuator 14 from points A to B (FIG. 2) may be adjusted using the set screw 20. However, the nature of both the 'snap-through' transitions and the concomitant dynamic effects is largely determined by the overload member 16 in conjunction with the inertia and damping in the system 10. Thus, it is desirable to a) provide greater adjustability in the marginal force magnitude and b) to limit the deleterious dynamic effects of the 'snap through' transitions without requiring external damping means. FIG. 4 provides an example for accomplishing the same.

Figure 5:
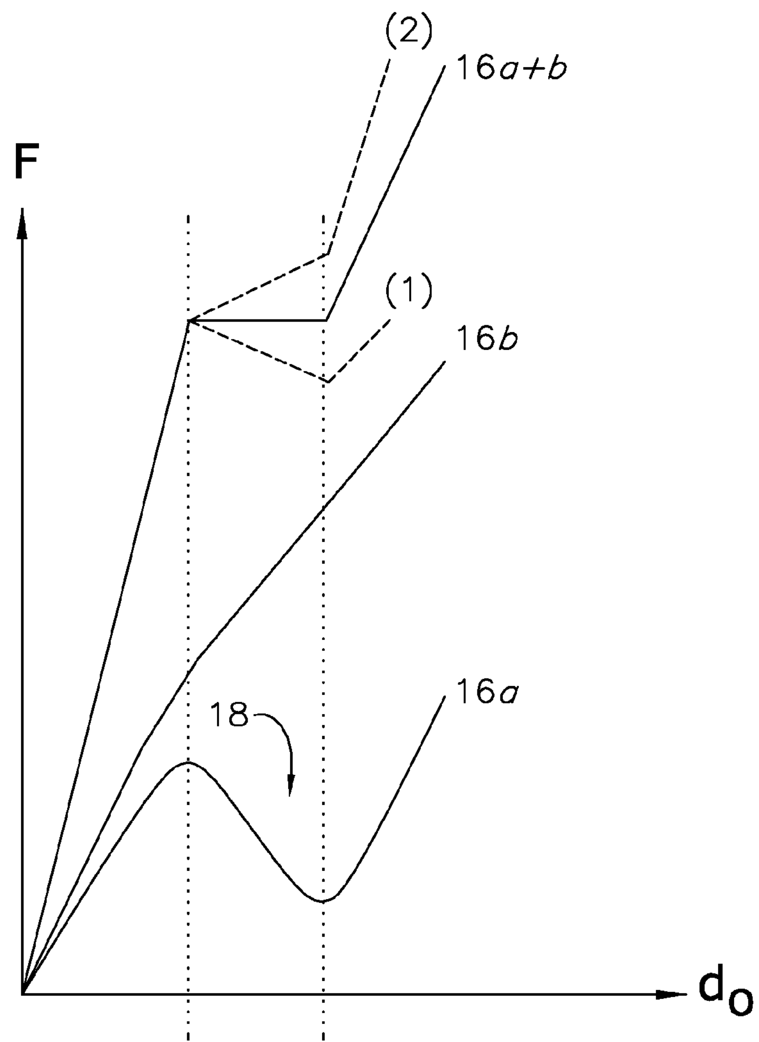
FIG. 5 is a line graph showing a force versus displacement space for the members shown in FIG. 4, both individually and in combination, wherein a nominally zero or force constant interval has been produced, and as shown in hidden-line type at (1) where a negative spring rate and (2) a positive spring rate over the same interval is produced.

In FIGS. 4 and 5, two different beams 16*a,b* are shown along with their respective Force-displacement characteristics for transverse loadings. The first beam 16*a* acts as a non-linear spring with a negative stiffness region 18 in its response as previously described. The second beam 16*b* acts as a spring with a monotonic response. Combining these two beams 16*a,b* mechanically in parallel using a rigid coupler 24 as shown (FIG. 4) yields the response shown in FIG. 5 by the composition curve (16*a*+*b*). It is appreciated that in the region 18 where the first beam 16*a* has negative stiffness, the effective spring has a spring rate that can be negative (1), zero, or positive (2) depending on the relative stiffnesses of the beams 16*a,b*. Designing a system 10 with a small effective stiffness (positive or negative) allows the deleterious dynamic effects corresponding to the 'snap-through' transitions to be mitigated. The effective force magnitude at which the 'snap-through' like transition occurs is now determined by the characteristics of both beams 16*a,b*; and the rigid coupler 24 provides means for the set screw 20 to engage both beams coextensively. It is certainly within the ambit of the present disclosure for a modular system 10 wherein different combinations from a plurality of beams 16*a*, . . . n are selectively coupled to yield a host of overload protection systems 10 exhibiting different behaviors.

As used herein, the terms "first", "second", and the like do not denote any order or importance, but rather are used to distinguish one element from another.

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 100° C. to below about −100° C. should be interpreted to include not only the explicitly recited limits of about 100° C. to below about −100° C., but also to include individual values, such as −50° C., 30° C., etc., and sub-ranges, such as from about 75° C. to about −25° C., etc. Furthermore when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

The invention claimed is:

1. An actuation assembly adapted for driving a load and preventing or mitigating an overload condition, the assembly comprising:

an actuator defining a stroke and presenting a design threshold force; and an overload protection device including at least one elastic member defining a force-deflection characteristic having a limit point and negative stiffness region therein;

wherein the member is drivenly coupled to the actuator opposite the load, and presents an initial deformation force not greater than the design threshold force, so as to define a non-linear force versus displacement relationship over the stroke when the actuator experiences an overload condition.

2. The assembly as defined in claim 1 wherein the at least one elastic member is a bi-stable member presenting a force-deflection characteristic having dual limit points and positive stiffness regions, and a negative stiffness region intermediate the positive stiffness regions.

3. The assembly as defined in claim 2 wherein the at least one member includes an elongated beam caused to bow away from, coupled to, and transversely driven by the actuator.

4. The assembly as defined in claim 3 wherein the at least one member is mechanically caused to store strain energy.

5. The assembly as defined in claim 4 wherein the at least one member presents first and second ends and defines a longitudinal length, and the device further includes first and second supports fixedly connected to the ends and defining a spacing less than the length, so as to deform the member and store strain energy therein.

6. The assembly as defined in claim 5 wherein at least one of the supports are adjustable, so as to modify the spacing.

7. The assembly as defined in claim 4 wherein the at least one member defines a longitudinal midpoint, and the device further includes a set screw operable to encroachingly engage the midpoint, so as to further cause the member to store strain energy and achieve a ready set condition.

8. The assembly as defined in claim 7 wherein the actuator and device are cooperatively configured such that the at least one member is caused to pass the limit point when the load is greater than the design force threshold.

9. The assembly as defined in claim 1 wherein the device includes a plurality of elastic members, and further comprises a rigid coupler fixedly coupling the members, and the actuator is connected to the coupler, so as to drivenly engage the plurality of members as a unit.

10. The assembly as defined in claim 9 wherein a first of the members presents a linear spring force-deflection characteristic, and a second of the members presents a force-deflection characteristic having a limit point and negative stiffness region therein, such that the first and second members cooperatively present an effective spring rate over a displacement interval.

11. The assembly as defined in claim 10 wherein the effective spring rate is negative over the interval.

12. The assembly as defined in claim 10 wherein the effective spring rate is positive over the interval.

13. The assembly as defined in claim 10 wherein the effective spring rate is nominally zero, so as to yield a constant force over the interval.

14. The assembly as defined in claim 1 wherein the actuator is an active material actuator.

15. The assembly as defined in claim 14 wherein the active material actuator is formed of thermally activated shape memory alloy.

* * * * *